No. 614,601. Patented Nov. 22, 1898.
W. S. G. BAKER.
ADJUSTABLE COLLAR.
(Application filed July 12, 1898.)
(No Model.)
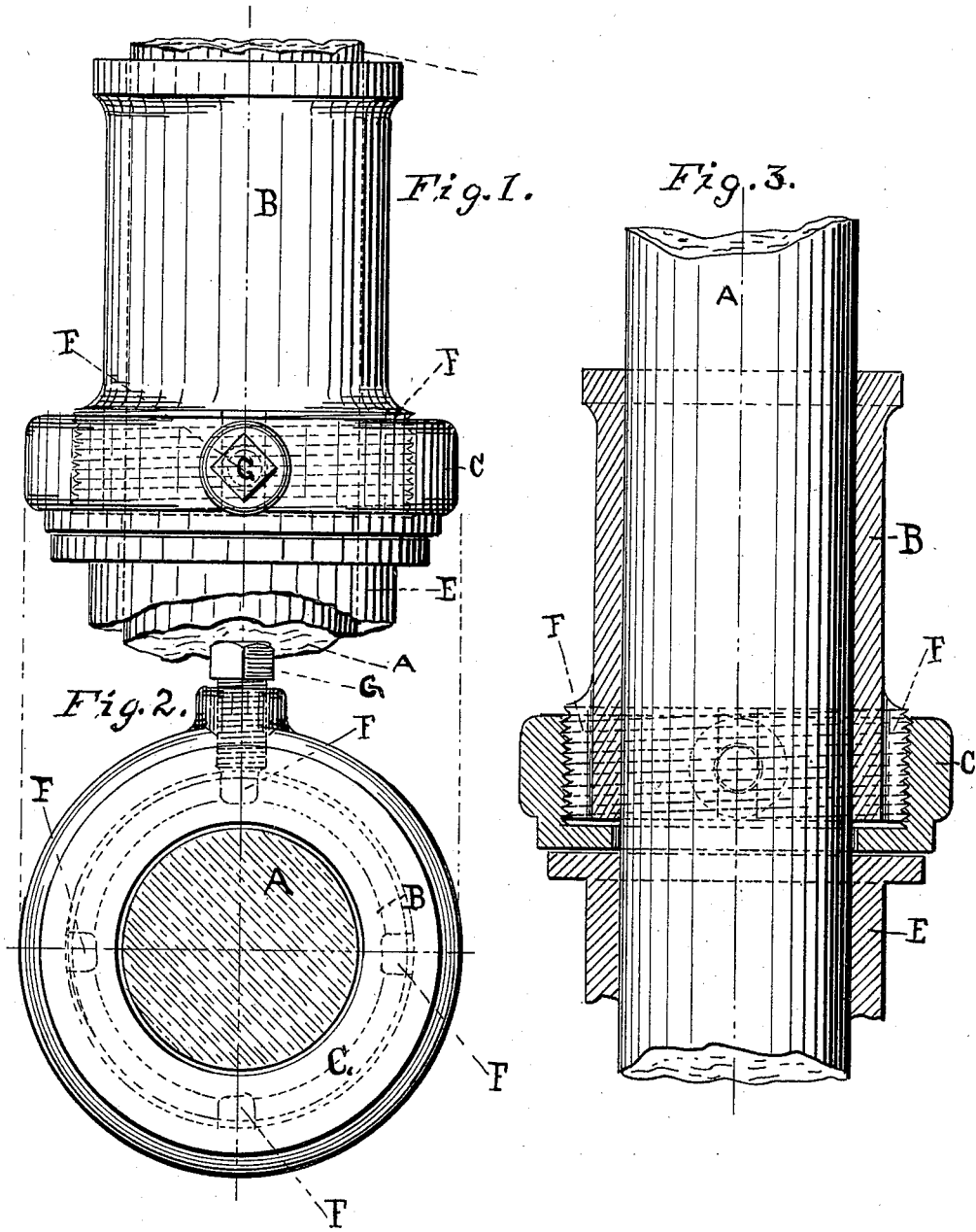
INVENTOR
William Sebastian Groff Baker

UNITED STATES PATENT OFFICE.

WILLIAM SEBASTIAN GRAFF BAKER, OF BALTIMORE, MARYLAND.

ADJUSTABLE COLLAR.

SPECIFICATION forming part of Letters Patent No. 614,601, dated November 22, 1898.

Application filed July 12, 1898. Serial No. 685,726. (No model.)

*To all whom it may concern:*

Be it known that I, WILLIAM SEBASTIAN GRAFF BAKER, a citizen of the United States, residing in the city of Baltimore, State of Maryland, have invented certain new and useful Improvements in Adjustable Collars for Shafts or Axles, of which the following is a specification.

My invention relates to improvements in that class of collars upon axles of electric-motor trucks so placed as to receive the end thrust of bearings at end of electric motors where they rest upon the axles. In this class of collars the part of motor-bearings that support end of motor upon the truck-axle and bear against the collar on the axle are subject to excessive wear, and if such wear is not provided for the end or lateral play becomes so great as to be very objectionable. By my invention I seek to overcome this objectionable feature and to keep this end play normal.

I attach a sleeve rigidly to the axle or shaft by any of the usual mechanical methods. This sleeve is threaded on the outside and slotted longitudinally. A loose threaded collar is screwed on this fixed collar or sleeve, which loose collar is fitted with a set-screw. It can be adjusted at will and when properly placed is held in position by the set-screw, which is screwed into one of the longitudinal slots formed on fixed sleeve, holding it rigidly on same.

In the accompanying drawings, Figure 1 is the elevation of a motor-truck axle with my improved adjustable collar applied; Fig. 2, an end elevation of same; Fig. 3, a transverse section of the adjustable collar on the axle.

Referring to the drawings, which show the particular construction of adjustable collar, A indicates the axle of an electric truck; B, fixed sleeve or collar upon the axle, preferably fixed by hydraulic pressure; C, loose collar threaded on the inside to screw upon the fixed sleeve or collar B, which is threaded to receive it. E indicates motor-bearing in which axle A revolves; F F F, slots formed in threaded portion of fixed sleeve; G, set-screw fitted in loose collar C, which can be screwed into slot formed in fixed sleeve or collar. This arrangement is such that the loose collar C can be adjusted upon fixed collar or sleeve B to any desired point and when so set can be held in place by set-screw G being screwed into one of the slots F, preventing it from moving.

I claim as my invention—

The combination of an axle or shaft with a fixed sleeve or collar threaded on outside and slotted longitudinally, a loose collar on said fixed collar threaded on inside and a set-screw fitting into the slots by means of which the loose collar can be held in place on fixed collar for the purpose specified.

WILLIAM SEBASTIAN GRAFF BAKER.

Witnesses:
J. PAUL BAKER,
DANIEL W. POWELL.